3,062,747
HYDRAULIC BRAKE FLUIDS

Harvey R. Fife, deceased, late of Chapel Hill, N.C., by Geraldine H. Fife, executrix, Chapel Hill, N.C., and Richard W. Shiffler, Briarcliff Manor, N.Y., assignors to Union Carbide Corporation, a corporation of New York
No Drawing. Filed June 23, 1960, Ser. No. 38,397
4 Claims. (Cl. 252—73)

The present invention relates to fluid compositions for use in hydraulic brake systems, and in particular, is concerned with improved, high-boiling hydraulic brake fluids consisting essentially of certain low molecular weight polyoxyalkylene gylcol monoalkyl ethers.

Hydraulic brake fluids have been in common use for some time. Moreover, over recent years, the development of improved fluid compositions of this nature has received considerable attention from those skilled in the art. For instance, with the increasing weight, horsepower and speed of modern automotive vehicles, a commensurate increase in the temperature developed during the normal operation of automotive hydraulic brake systems has been brought about. Consequently, the heat build-up within these brake systems, hence within the hydraulic fluids contained therein, has also increased considerably over that encountered in the past. Unfortunately, under these more severe operating conditions, conventional hydraulic brake fluids having boiling points substantially below about 400° F. often demonstrate a tendency to vaporize in use. Thus, under such conditions, the normally liquid and non-compressible hydraulic brake fluid is converted into a compressible vapor, thereby rendering the hydraulic brake system inoperable. In an effort to overcome this disadvantage, higher-boiling hydraulic brake fluids evidencing less of a tendency to vaporize during use are constantly sought by the art.

However, it is also important that the desired higher boiling points be obtained with little or no sacrifice of other essential properties of the hydraulic brake fluids. By way of illustration, a fluid composition of this type must be stable both chemically and physically. The component parts of the fluid must not react with one another under the various operating conditions of temperature and pressure and must not separate out at low temperatures. In addition, the fluid should be substantially non-reactive toward other material components of the hydraulic brake system, such as the metal or rubber parts of the system which are exposed to the fluid during normal operation.

In general, no one fluid composition has, to date, been found entirely satisfactory as a high-boiling hydraulic brake fluid. Rather, complex mixtures of various fluid compositions are ordinarily employed, each component contributing certain desirable properties to the hydraulic brake fluid of which it is a part. Unfortunately, certain difficulties ordinarily accompany the formulation of such fluid mixtures. For instance, the proportions of the various fluid components must be carefully chosen and controlled within limited ranges, since an excess of any one component is also likely to impart certain undesirable properties to the hydraulic fluid. This problem becomes particularly predominant with the more complex mixtures containing three or more different fluid components.

As illustrative in this connection, high molecular weight organic liquids, such as the polyoxyalkylene glycol ethers having an average molecular weight of about 500 or higher, and particularly the butyl ether derivatives, have heretofore been employed as a major or substantial component of hydraulic brake fluids. In this manner, hydraulic brake fluids possessing high boiling points have been obtained. However, the viscosity of the hydraulic brake fluids prepared at least in part from these high molecular weight organic liquids, other factors being constant, generally increases in direct relationship to the molecular weight of the aforementioned liquid component. Consequently, although a suitably high boiling point may be reached, subsequent use of the hydraulic brake fluids is often precluded due to their high viscosity, particularly at low temperatures. On the other hand, when conventional diluents, such as diethylene glycol monoethyl ether, ethylene glycol monobutyl ether, methylamyl alcohol or the like, are also incorporated as additional components in the hydraulic brake fluids in an amount sufficient to decrease the viscosity of the fluids to a commercially acceptable level, the boiling point of the resulting fluids frequently is decreased to an undesirable extent. As a result of these and other considerations, numerous difficulties have heretofore been encountered in formulating complex fluid mixtures for use as hydraulic brake fluids.

The disadvantages of the prior art, as hereinabove described, can now be overcome to a substantial extent through the practice of the present invention, whereby one or more of the following objects can be achieved.

It is an object of this invention to provide fluid compositions for use in hydraulic brake systems having a minimum boiling point of about 400° F., yet retaining substantially all of the characteristics hereinabove described which are presently desired in hydraulic brake fluids. It is another object of this invention to provide improved hydraulic brake fluids comprised essentially of a single fluid component, such essentially sole fluid component in and of itself performing the functions of a hydraulic brake fluid, although it can be modified for various other purposes. Still other objects will become apparent in connection with the following description.

The present invention is based upon the finding that certain low molecular weight polyoxyalkylene glycol monoalkyl ethers will serve as efficient hydraulic brake fluids. More particularly, in the broadest aspect, the hydraulic brake fluids of this invention are the normally liquid methyl and ethyl monoethers of mixed poly(oxyethylene-oxy-1,2-propylene) glycols (a) having an average molecular weight of from about 175 to about 325; (b) in which there are present an average of from about 3 to about 5 oxyalkylene groups per molecule; (c) in which the oxyethylene and oxypropylene groups present each represent from about 35 percent to about 65 percent by weight based upon the total weight of the oxyalkylene groups present; and (d) in which the terminal alkyl radical is selected from the group consisting of the methyl and ethyl radicals. These liquid compositions possess boiling points of at least about 400° F., have desirable freezing point and lubricating properties and no not have an excessive swelling effect upon rubber. Accordingly, it has been found that the polyoxyalkylene glycol monoalkyl ethers of this invention do not require modification with other dissimilar fluids in order to provide compositions suitable for use in hydraulic brake systems. and can therefore be employed as an essentially single fluid component, high-boiling hydraulic brake fluid.

When desired, small amounts of conventional corrosion inhibitors and antioxidants can be added to the hydraulic brake fluids of this invention. Moreover, with those additives evidencing limited or non-solubility in the polyoxyalkylene glycol monoalkyl ethers herein described, a small amount of a lower alkylene glycol generally just sufficient to provide a solvent for the additive can also be incorporated in the hydraulic brake fluids of this invention without disadvantageously affecting the desirable physical properties of the fluid. It is to be noted in this connection, that the lower alkylene glycol need not be utilized in the absence of those corrosion inhibitors or antioxidants evidencing limited or non-solubility in the polyoxyalkylene glycol monoalkyl ethers of this invention, and need never be employed in amounts sufficient to substantially modify the essential physical properties of such polyoxyalkylene glycol monoalkyl ethers which render the compositions suitable for use as hydraulic brake fluids.

The useful range of the polyoxyalkylene glycol monoalkyl ethers to be employed as high-boiling hydraulic brake fluids in accordance with this invention has been found to be limited in part by their molecular weight. For example, the polyoxyalkylene glycol monoalkyl ethers having an average molecular weight of below about 175, containing an average of less than about 3 oxyalkylene groups per molecule, ordinarily do not possess the lubricating properties desired of the hydraulic brake fluid. Moreover, such compounds may have boiling points below about 400° F., thus precluding their sole use in applications requiring a high-boiling hydraulic brake fluid. On the other hand, the polyoxyalkylene glycol monoalkyl ethers having an average molecular weight above about 325, containing an average of substantially more than about 5 oxyalkylene groups per molecule, have viscosities that are too high, particularly at low temperature, to permit their use as single fluid component high-boiling hydraulic brake fluids. Many such high molecular weight liquids also have undesirable freezing point properties.

The polyoxyalkylene glycol monoalkyl ethers suitable for use as high-boiling hydraulic brake fluids in accordance with this invention have further been found limited by the number of carbon atoms in the alkyl radicals of the alkyl ether grouping contained therein. For instance, as the number of carbon atoms in the aforementioned alkyl radicals increases, a concomitant increase has been found to occur in the swelling effect that these fluids have upon rubber. Hence, since in commercial use, an excessive swelling effect upon rubber is a characteristic to be avoided, the useful polyoxyalkylene glycol monoalkyl ethers are, in accordance with this invention, limited to those in which the alkyl grouping contains up to about 2 carbon atoms, such as methyl or ethyl radicals, and is preferably a methyl radical.

Moreover, it has been found that an increase in the oxypropylene content of the polyoxyalkylene glycol monoalkyl ethers also engenders a commensurately increasing swelling effect upon rubber. Thus, for reasons similar to those just described, the polyoxyalkylene glycol monoalkyl ethers of this invention are limited to those in which the oxypropylene groups present represent a maximum of about 65 percent by weight based upon the total weight of the oxyalkylene groups present. On the other hand, while a low oxypropylene content is desirable in order to minimize rubber swelling, a corresponding increase in the oxyethylene content of the polyoxyalkylene glycol monoalkyl ethers has been found to have adverse effect upon the desired low temperature properties of the product, and particularly upon the freezing point of the product. This is especially true in connection with the relatively higher molecular weight polyoxyalkylene glycol monoalkyl ethers containing an average of about 5 oxyalkylene groups per molecule. In addition, an increase in the oxyethylene content has also been found to provide fluids having higher viscosities. Concordant with these findings, the polyoxyalkylene glycol monoalkyl ethers of this invention are, for commercial purposes, restricted to those in which the oxyethylene groups present represent a maximum of about 65 percent by weight based upon the total weight of the oxyalkylene groups present. The preferred polyoxyalkylene glycol monoethers are those in which the oxyethylene groups present represent from about 50 percent to about 60 percent by weight based upon the total weight of the oxyalkylene groups present.

The polyoxyalkylene glycol monoalkyl ethers of this invention can be prepared in any convenient manner, as for example, by conventional processes of the type described in U.S. Patent 2,425,755, involving the addition of both ethylene oxide and 1,2-propylene oxide, either sequentially or as a mixture, to a monohydroxy alcohol such as methanol, ethanol, ethylene glycol monomethyl ether, ethylene glycol monoethyl ether, propylene glycol monomethyl ether or propylene glycol monoethyl ether. These processes are ordinarily carried out in the presence of catalytic amounts of an alkaline catalyst, such as sodium hydroxide or potassium hydroxide, under moderate pressure and at a reaction temperature of from about 80° C. to about 160° C. Somewhat higher or lower reaction temperatures can also be employed satisfactorily.

In the production of the polyoxyalkylene glycol monoalkyl ethers as herein described, the reactants are generally utilized in proportions effecting the presence in the reaction mixture of from about 3 to about 5 oxyalkylene groups per mole of monohydroxy alcohol undergoing reaction. Thus, for example, when the monohydroxy alcohol is an alkylene glycol monoether derivative in which one oxyalkylene group is initially present, not more than about 4 moles of alkylene oxide per mole of the monohydroxy alcohol should be employed in the reaction. In this manner, an average substantially in excess of about 5 oxyalkylene groups per molecule will not be present in the product. In addition, the specific reactants and their proportions must be chosen so that the resulting product will contain not less than about 35 percent nor more than about 65 percent by weight of either oxyalkylene group, i.e. oxyethylene or oxypropylene group, based upon the total weight of the oxyalkylene groups present, and preferably so that the resulting product will contain from about 50 percent to about 60 percent by weight of oxyethylene groups based upon the total weight of the oxyalkylene groups present. Thus, for example, when the monohydroxy alcohol is an alkylene glycol monoether derivative, the alkylene oxide mixture utilized as a reactant should not be composed of more than from about 50 percent to about 60 percent by weight of the alkylene oxide corresponding to the oxyalkylene group present in the monohydroxy alcohol, depending upon the proportion in which the reactants are employed. By way of illustration, particularly useful products have been obtained by reacting either methanol or ethylene glycol monomethyl ether with an equal weight mixture of ethylene oxide and 1,2-propylene oxide in a proportion of from about 3 to about 4 moles of the alkylene oxide mixture per mole of the monohydroxy alcohol undergoing reaction. It is to be noted in this connection, that, as employed herein, the number of moles of the alkylene oxide mixture utilized as a reactant is calculated based upon the average molecular weight of the mixture.

Upon completion of the reaction producing the polyoxyalkylene glycol monoalkyl ether, the desired product is generally recovered from the crude reaction mass as a residue product by neutralizing the alkaline catalyst by reaction with an acid with which the catalyst will form a filterable salt, or by contacting the catalyst with a suitable adsorbent, followed by the filtration and distillation of the crude. The filtration can be performed either prior or subsequent to distillation. Moreover, under certain circumstances as hereinafter described, the filtration step can be omitted.

The distillation of the crude is conducted in order to remove as a distillate any unreacted alkylene oxide and/or unreacted monohydroxy alcohol, as well as any water and monoalkylene glycol present, and to assure the recovery of desired polyoxyalkylene glycol monalkyl ether as the residue product. To this end, the crude is preferably stripped up to a temperature of about 65° C. under a reduced pressure of about 5 millimeters of mercury. Any other convenient recovery procedure can also be utilized.

When the polyoxyalkylene glycol monoalkyl ethers of this invention are to be used as hydraulic brake fluids, small amounts of conventional corrosion inhibitors and antioxidants can, when desired, be added thereto. Generally, for this purpose, a total of from about 0.2 percent to about 2 percent by weight of the additive(s), based upon the total weight of the hydraulic brake fluids is utilized, although somewhat higher or lower concentrations are also effective. By way of illustration, suitable corrosion inhibitors include amines such as mono- and dibutyl amine, mono- and diamyl amine, dioctyl amine, etc.; salts of these amines with acids such as boric acid or dilinoleic acid etc.; alkali metal borates such as borax or potassium tetraborate etc.; and the like. Such compounds, it is to be noted, ordinarily serve as buffering agents by providing reserve alkalinity, so that the pH of the resulting fluid composition is maintained within a commercially acceptable range. Suitable antioxidants include diphenylol propane, phenyl alpha-naphthyl amine, polymerized trimethyl dihydroxy quinoline, alkyl phenols, polyalkyl polyphenols, styrenated phenols etc., and the like. In particular, especially good results have been realized by adding mixtures of borax, or other alkali metal borates, and diphenylol propane to the polyoxyalkylene glycol monoalkyl ethers of this invention in concentrations of from about 0.2 percent to about 0.5 percent by weight of each of the additives based upon the total weight of the hydraulic brake fluid.

The corrosion inhibitors and antioxidants can be incorporated in the polyoxyalkylene glycol monoalkyl ethers of this invention either prior or subsequent to the distillation of the crude as hereinabove described. In this connection, it has been found that a compound such a borax or boric acid is particularly useful in the neutralization or removal of the alkaline catalyst. Thus, for instance, borax or boric acid can be added to the crude in an amount sufficient to react completely with the alkaline catalyst. The resulting alkali metal borate product thereby formed need not be filtered from the crude since such compound serves as a corrosion inhibitor when present.

In addition, when the incorporation of a corrosion inhibitor or antioxidant which evidences limited or nonsolubility in the polyoxyalkylene glycol monoalkyl ethers of this invention is desired, e.g. an alkali metal borate, a small amount of a lower alkylene glycol in which such additive is soluble, and which in turn is soluble in, or miscible with the polyoxyalkylene glycol monoalkyl ether, can also be incorporated therewith. The term "lower alkylene glycol," as employed herein and in the appended claims, is meant to include ethylene glycol, propylene glycol and mixtures thereof with diethylene glycol and/or dipropylene glycol in which the monomeric glycol component is present in substantial, and preferably at least equal proportions with respect to the dialkylene glycol component. Particularly good results have been obtained using mixtures of ethylene glycol and diethylene glycol in which each component is present in equal concentration by weight. The lower alkylene glycol is generally and preferably employed in an amount just sufficient to provide a solvent for the corrosion inhibitor or antioxidant which otherwise evidences insolubility or only partial solubility in the polyoxyalkylene glycol monoalkyl ethers of this invention and, to this end, is utilized in a maximum concentration of up to about 10 percent by weight, and more preferably in a concentration no greater than about 5 percent by weight based upon the total weight of the hydraulic brake fluid. Moreover, the lower alkylene glycol can be incorporated in the polyoxyalkylene glycol monoalkyl ether product either prior or subsequent to the distillation of the crude as hereinabove described, with the latter procedure ordinarily being preferable due to the otherwise possible loss of the lower alkylene glycol during distillation. Where borax or boric acid is employed to react with the alkaline catalyst, however, the lower alkylene glycol is nevertheless generally introduced prior to the distillation of the crude in order to keep the resulting borate product in solution.

The present invention can be illustrated further in connection with the following specific examples, but is not intended to be limited thereby.

EXAMPLE I

A liquid poly(oxyethylene-oxy-1,2-propylene) glycol monomethyl ether composition suitable for use as a high-boiling hydraulic brake fluid was prepared by the reaction of an equal weight mixture of ethylene oxide and 1,2-propylene oxide with ethylene glycol monomethyl ether in a proportion of 3.0 moles of the alkylene oxide mixture per mole of the monohydroxy alcohol. The reaction was carried out by introducing the alkylene oxide mixture to the monohydroxy alcohol in the presence of about 0.2 percent by weight of a potassium hydroxide catalyst based upon the total weight of the reactants, at a temperature of about 110° C., under a pressure of about 60 pounds per square inch and at an alkylene oxide feed rate of about 100 cubic centimeters per minute. Upon the complete introduction of the alkylene oxide mixture, the reaction mixture was stirred at 110° C. for an additional period of about one hour. Thereafter, the crude reaction product was distilled in the presence of 2 percent by weight of an aluminum silicate adsorbent (Filtrol X–202, manufactured by the Filtrol Corp.), at a temperature of 65° C., under a reduced pressure of 5 millimeters of mercury. The residual product subsequently filtered to remove the absorbent. To the poly(oxyethylene-oxy-1,2-propylene) glycol residue product thus obtained, there were added 0.5 percent by weight of potassium tetraborate, 0.5 percent by weight of diphenylol propane, 2.5 percent by weight of ethylene glycol and 2.5 percent by weight of diethylene glycol based upon the total weight of the resulting fluid. The product was then evaluated as a hydraulic brake fluid by a comparison of the physical properties of the product with specifications adapted by the Society of Automotive Engineers for hydraulic brake fluids as described in SAE specifications 7OR 1 and 7OR 3. The results obtained are set forth below in Table A.

*Table A*

|  | Product Properties | SAE Specifications |
|---|---|---|
| Boiling Point (° F.) | 446 | 375 (minimum). |
| Flash point (° F.) | 265 | 180 (minimum). |
| Viscosity (centistokes) [1] | 4.68 | 4.0 (minimum). |
| Viscosity (centistokes) [2] | 1,170 | 1,800 (maximum). |
| Rubber Swelling (percent) [3] | 1.13 | 4.0 (maximum). |
| Evaporation Test (percent residue) | 57 | 20 (minimum). |
| Cylinder Residue Test [4] | passes | No hard, dry or gummy residues or corrosion. |
| Lubrication, Heat Stroke Test | passes | 150.00 strokes at 158° F. and 500 p.s.i. |
| Cold Test [5] | clear and pours | Flow in 5 sec. |
| pH (before) [6] | 10.85 | 7–11. |
| pH (after) [6] | 10.65 | 6–11. |
| Corrosion Test (mg./cm.² loss): [7] | | |
| Tin | 0.00 | 0.2. |
| Brass | 0.02 | 0.5. |
| Copper | 0.03 | 0.5. |
| Steel | 0.01 | 0.2. |
| Aluminum | 0.02 | 0.1. |
| Cast iron | 0.06 | 0.2. |

[1] Measured at 130° F.
[2] Measured at −40° F.
[3] Measured using Manhattan Natural rubber, after 6 days at 210° F.
[4] Measured after 14 days at 158° F.
[5] Measured after 6 days at −40° F. and after 6 hours at −60° F.
[6] Measured from a 50 percent aqueous mixture.
[7] Measured after 5 days at 210° F.

From the above table, it can be seen that the hydraulic brake fluid of this invention meets the existing SAE specifications shown and, advantageously, and has a boiling point well in excess of 400° F.

EXAMPLE II

Various liquid poly(oxyethylene-oxy-1,2-propylene)

glycol monomethyl ether compositions suitable for use as high-boiling brake fluids were prepared by the reaction of equal weight mixtures of ethylene oxide and 1,2-propylene oxide with methanol and with ethylene glycol monomethyl ether. In run Nos. 1 to 4, ethylene glycol monomethyl ether was employed as a reactant; in run Nos. 5 to 7, methanol was employed as a reactant. Further, in run No. 1, the reactants were utilized in a ratio of 2.9 moles of the alkylene oxide mixture per mole of the monohydroxy alcohol; in run Nos. 2 and 5 the reactants were utilized in a ratio of 3.4 moles of the alkylene oxide mixture per mole of the monohydroxy alcohol; in run Nos. 3 and 6, the reactants were utilized in a ratio of 3.9 moles of the alkylene axide mixture per mole of the monohydroxy alcohol; and in run Nos. 4 and 7, the reactants were utilized in a ratio of 4.4 moles of the alkylene oxide mixture per mole of the monohydroxy alcohol. The reactions were carried out and the products recovered and subsequently evaluated as hydraulic brake fluids as described in Example I. In this series of experiments, the use of the corrosion inhibitor, antioxidant and lower alkylene glycol solvent was omitted. The results obtained are tabulated below in Table B.

scribed in Example I. The results obtained are tabulated below in Table C.

Table C

| | Run Nos. | |
|---|---|---|
| | 3 | 6 |
| Boiling Point (° F.) | 441 | 428. |
| Viscosity (Centistokes) [1] | 5.19 | 5.38. |
| Viscosity (Centistokes) [2] | 1,522 | 1,685. |
| Evaporation Test (percent residues) | 44.0 | 47.4. |
| Rubber Swelling (percent) [3] | 1.92 | 1.77. |
| Cold Test [4] | Clear and Pours. | Clear and Pours. |
| pH (after) [5] | 10.13 | 10.38. |
| Corrosion Test: [6] | | |
| Tin | Bright | Bright. |
| Brass | ---do--- | Do. |
| Cast Iron | ---do--- | Do. |
| Steel | ---do--- | Do. |

[1] Measured at 130° F.
[2] Measured at −40° F.
[3] Measured using Manhattan Natural rubber, after 6 days at 210° F.
[4] Measured after 6 days at −40° F.
[5] Measured using a 50 percent aqueous mixture.
[6] Measured visually.

Table B

| | Run. Nos. | | | | | | |
|---|---|---|---|---|---|---|---|
| | 1 | 2 | 3 | 4 | 5 | 6 | 7 |
| Boiling Point (° F.) | 475 | 482 | 506 | 522 | 472 | 472 | 492. |
| Viscosity (centistokes).[1] | 4.27 | 4.66 | 5.4 | 5.87 | 4.34 | 4.79 | 5.4. |
| Viscosity (centistokes).[2] | 864 | 1,111 | 1,510 | Freezes | 930 | 1,200 | 1,569. |
| Rubber Swelling (Percent).[3] | 2.41 | 2.09 | 2.05 | 2.25 | 3.05 | 2.71 | 3.03. |
| Cold Test [4] | Clear and Pours. | Clear and Pours. | Hazy and Pours. | | Clear and Pours. | Clear and Pours. | Hazy and Pours. |

[1] Measured at 130° F.
[2] Measured at −40° F.
[3] Measured using Manhattan Natural rubber, after 6 days at 210° F.
[4] Measured at −40° F.

From the above table, it can be seen that the hydraulic brake fluids obtained in run Nos. 1 to 3 and 5 to 7 meet existing SAE specification and, advantageously, have boiling points well in excess of 400° F. The fluid of run No. 4 on the other hand, containing substantially more than 5 oxyalkylene groups present per polyoxyalkylene glycol monoalkyl ether molecule, fails to meet SAE specifications. Polyoxyalkylene glycol monoalkyl ether compositions having unsatisfactory low temperature properties, as evidenced, for example, by freezing at a temperature of 0° F., were produced in a manner similar to that described above, using however, an alkylene oxide mixture containing 66 percent by weight of ethylene oxide and 34 percent by weight of 1,2-propylene oxide, and by adding the alkylene oxide mixture to methanol in mole ratios of 2.5 to 1 and 4 to 1.

EXAMPLE III

To portions of each of the liquid compositions obtained in run Nos. 3 and 6 of Example II, there were added approximately 2.5 percent by weight of ethylene glycol, 2.5 percent by weight of diethylene glycol, 0.25 percent by weight of potassium tetraborate and 0.5 percent by weight of diphenylol propane, based upon the total weight of the resulting fluid. The products were then evaluated as hydraulic brake fluids in a manner similar to that de-

EXAMPLE IV

To a portion of the liquid composition obtained in run No. 3 of Example II there were added with dissolution 0.5 percent by weight of diphenylol propane and 0.25 percent by weight of the dibutyl amine dimer acid salt of linoleic acid containing a 4 to 1 amine to acid mole ratio. The products were then evaluated as hydraulic brake fluids in a manner similar to that described in Example I. The results obtained are tabulated below in Table D.

Table D

| | |
|---|---|
| Boiling point (° F.) | 510 |
| Viscosity (centistokes) [1] | 2.31 |
| Viscosity (centistokes) [2] | 1645 |
| Evaporation (percent residue) | 45–50 |
| pH (before) [3] | 10.4 |
| pH (after) [3] | 9.7 |
| Corrosion test (mg./cm.[2] loss): [4] | |
| Tin | .00 |
| Brass | .05 |
| Corrosion test (mg./cm.[2] loss): [4] | |
| Copper | .13 |
| Cast iron | .01 |
| Steel | .00 |
| Aluminum | .00 |

[1] Measured at 210° F.
[2] Measured at −40° F.
[3] Measured using a 50 percent aqueous mixture.
[4] Measured after 5 days at 210° F.

EXAMPLE V

Various liquid poly(oxyethylene-oxy-1,2-propylene) glycol monomethyl and monethyl ether compositions suitable for use as high-boiling brake fluids were prepared by the reaction of a mixture containing 40 percent by weight of ethylene oxide and 60 percent by weight of 1,2-propylene oxide with ethylene glycol monomethyl ether (run No. 8) and with ethylene glycol monoethyl ether (run No. 9) in a ratio of 4 moles of the alkylene oxide mixture per mole of the monohydroxy alcohol. The reactions were carried out and the products recovered and subsequently evaluated as hydraulic brake fluids as described in Example I. The results obtained are set forth below in Table E.

*Table E*

|  | Run Nos. | |
| --- | --- | --- |
|  | 8 | 9 |
| Boiling Point ° F | 492 | 519. |
| Viscosity (Centistokes) [1] | 5.29 | 5.26. |
| Viscosity (Centistokes) [2] | 1,563 | 1,663. |
| Rubber Swelling (percent) [3] | 2.25 | 3.23. |
| Cold Test [4] | Clear and Pours. | Clear and Pours. |
| Lubrication, Heat Stroke Test [5] | Passes |  |
| Evaporation Test (percent residue) | 75 |  |

[1] Measured at 130° F.
[2] Measured at −40° F.
[3] Measured using Manhattan Natural rubber, after 6 days at 210° F.
[4] Measured after 6 hrs. at −60° F.
[5] Measured at 70,000 strokes, under a pressure of 1,000 p.s.i., at 250° F From the above table, it can be seen that the hydraulic brake fluids of this invention meet existing SAE specifications and, advantageously, have boiling points well in excess of 400° F.

What is claimed is:

1. In a method for applying pressure to a hydraulic brake through a hydraulic brake fluid, the improvement wherein said hydraulic brake fluid consists essentially of a poly(oxyethylene-oxy-1,2-propylene) glycol monoalkyl ether (a) having an average molecular weight of from about 175 to about 325, (b) in which there is present an average of from about 3 to about 5 oxyalkylene groups per molecule, (c) in which the oxyethylene groups and oxy-1,2-propylene groups are each present in a proportion of from about 35 percent to about 65 percent by weight, based upon the total weight of the oxyalkylene groups present, and (d) in which the terminal alkyl radical is selected from the group consisting of methyl and ethyl radicals.

2. In a method for applying pressure to a hydraulic brake through a hydraulic brake fluid, the improvement wherein said hydraulic brake fluid consists essentially of a poly(oxyethylene-oxy-1,2-propylene) glycol monoalkyl ether (a) having an average molecular weight of from about 175 to about 325, (b) in which there is present an average of from about 3 to about 5 oxyalkylene groups per molecule, (c) in which the oxyethylene groups are present in a proportion of from about 50 percent to about 60 percent by weight based upon the total weight of the oxyalkylene groups present, and (d) in which the terminal alkyl radical is selected from the group consisting of methyl and ethyl radicals.

3. In a method for applying pressure to a hydraulic brake through a hydraulic brake fluid, the improvement wherein said hydraulic brake fluid consists essentially of at least about 90 percent by weight of a poly(oxyethylene-oxy-1,2-propylene) glycol monoalkyl ether (a) having an average molecular weight of from about 175 to about 325, (b) in which there is present an average of from about 3 to about 5 oxyalkylene groups per molecular, (c) in which the oxyethylene groups and oxy-1,2-propylene groups are each present in a proportion of from about 35 percent to about 65 percent by weight based upon the total weight of the oxyalkylene groups present, and (d) in which the alkyl radical is selected from the group consisting of methyl and ethyl radicals, the remainder of said hydraulic brake fluid being a lower alkylene glycol selected from the group consisting of ethylene glycol, propylene glycol and mixtures thereof with a member selected from the group consisting of diethylene glycol and dipropylene glycol.

4. In a method for applying pressure to a hydraulic brake through a hydraulic brake fluid, the improvement wherein said hydraulic brake fluid consists essentially of at least about 95 percent by weight of a poly(oxyethylene-oxy-1,2-propylene) glycol monoalkyl ether (a) having an average molecular weight of from about 175 to 325, (b) in which there is present an average of from about 3 to about 5 oxyalkylene groups per molecule, (c) in which the oxyethylene groups are present in a proportion of from about 50 percent to about 60 mole percent by weight based upon the total weight of the oxyalkylene groups present, and (d) in which the terminal alkyl radical is selected from the group consisting of methyl and ethyl radicals, the remainder of said hydraulic brake fluid being a lower alkylene glycol selected from the group consisting of ethylene glycol, propylene glycol and mixtures thereof with a member selected from the group consisting of diethylene glycol and dipropylene glycol.

References Cited in the file of this patent

UNITED STATES PATENTS 2,425,755    Roberts et al.    Aug. 19, 1947

FOREIGN PATENTS 534,750    Canada    Dec. 18, 1956